United States Patent

[11] 3,580,347

| [72] | Inventor | Donald J. McGee<br>Troy, Mich. |
|---|---|---|
| [21] | Appl. No | 690,164 |
| [22] | Filed | Dec. 13, 1967 |
| [45] | Patented | May 25, 1971 |
| [73] | Assignee | Dura Corporation |

[54] TAPERED SPRING LEAF SUSPENSION FOR DRIVER TANDEM AXLE ASSEMBLY
13 Claims, 5 Drawing Figs.

[52] U.S. Cl.................................................. 180/22,
267/38, 267/40, 267/54, 280/104.5, 280/124
[51] Int. Cl.................................................. B60g 5/00,
B60g 19/02
[50] Field of Search.......................................... 280/124,
104.5 (B), 104.5; 267/36, 38, 40, 47, 54; 180/22,
23, 24

[56] References Cited
UNITED STATES PATENTS

| 2,054,305 | 9/1936 | Stilwell | 267/54X |
| 2,458,816 | 1/1949 | Woods | 280/124 |
| 2,626,144 | 1/1953 | Stephen | 280/124X |
| 2,655,388 | 10/1953 | Nabors | 280/104.5 |
| 2,907,579 | 10/1959 | Masser | 280/104.5 |
| 3,024,038 | 3/1962 | Butler | 280/104.5(B) |
| 3,053,527 | 9/1962 | Hallam | 267/47 |
| 3,157,412 | 11/1964 | Frazier | 280/104.5(B) |
| 3,365,190 | 1/1968 | Usalis | 267/54 |

*Primary Examiner*—A. Harry Levy
*Attorney*—David A. Maxon

ABSTRACT: This specification discloses a suspension for a motor vehicle or trailer. The suspension comprises multiple tapered leaf springs fixed near their centers to an axle. At tareweight, the leaves are separated from each other near their ends. At full load, the leaves are compressed together near their ends. This provides a changing spring rate corresponding to variance of load. The arm of one leaf is rigid to horizontal compression, resisting acceleration and braking loads.

FIG. 1
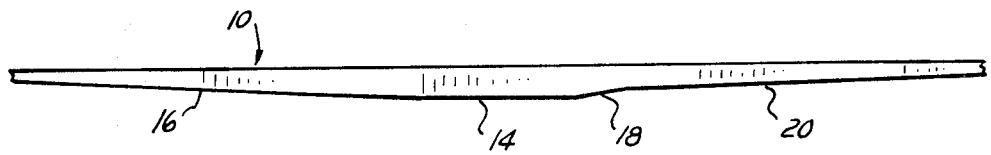
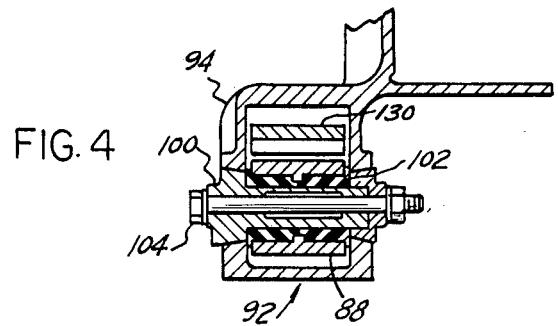
FIG. 4
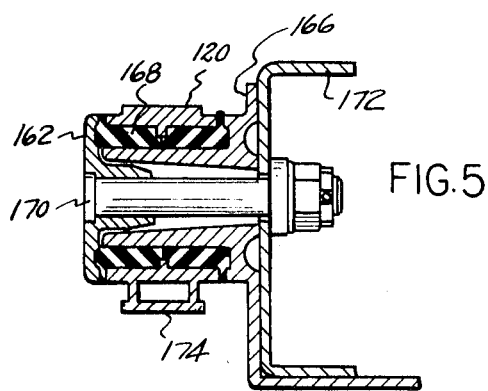
FIG. 5
INVENTOR
DONALD J. McGEE
BY David C. Maxim
ATTORNEY

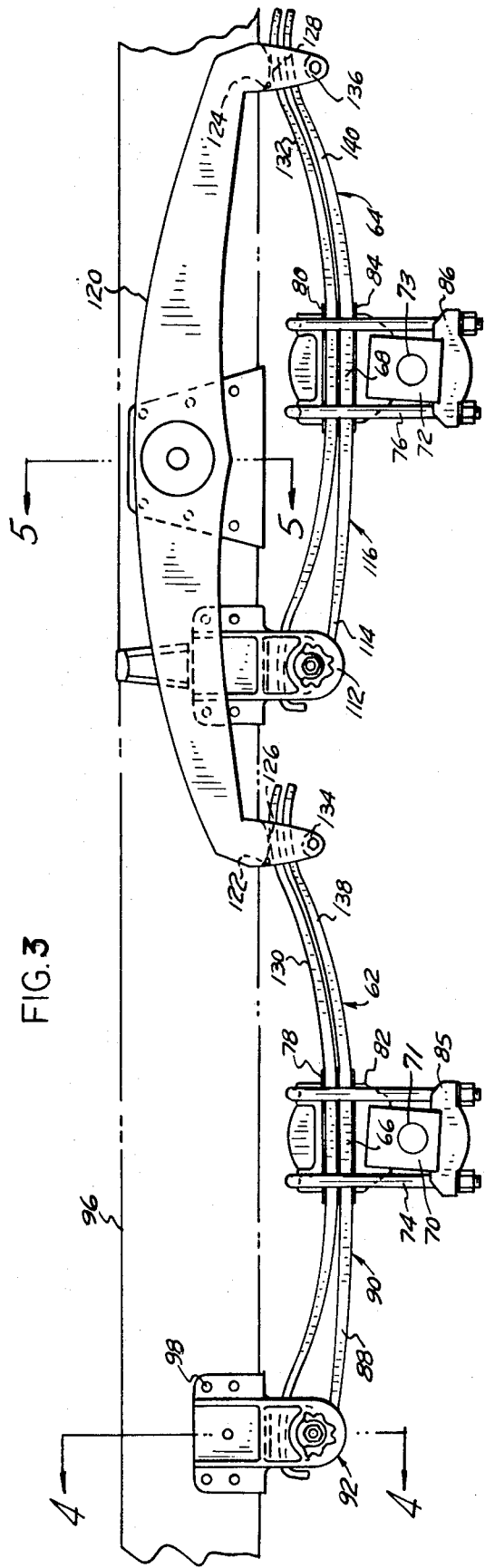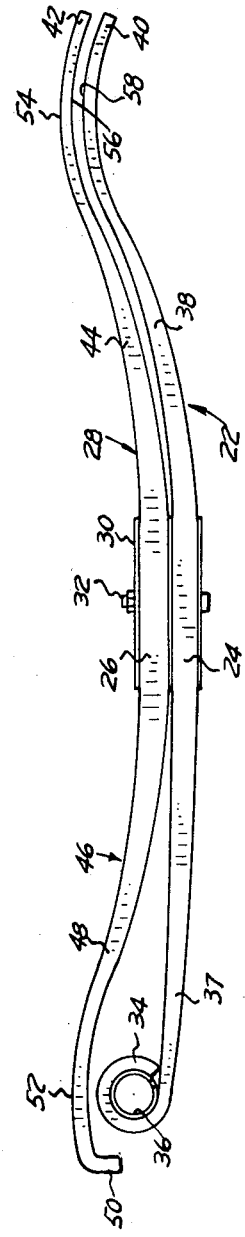

3,580,347

TAPERED SPRING LEAF SUSPENSION FOR DRIVER TANDEM AXLE ASSEMBLY

This invention relates generally to suspensions for trucks and trailers. More specifically, this invention relates to a suspension for a truck or tailer embodying a multitapered leaf spring having one leaf secured on a bracket fixed to the frame, and another leaf seated against a cam fixed to the truck frame at one end and free from contact from another cam fixed to the frame at its other end until the truck is loaded.

In truck and trailer suspensions, it is desirable to have a suspension system capable of providing a different spring rate for loaded and unloaded conditions of a truck or trailer. This desirable characteristic of having a different spring rage for loaded and unloaded conditions must be considered together with the necessity for minimum levels of strength in means for suspending such vehicles. It is also desirable that the spring rate vary in a smooth continuous manner as increased load is placed upon a vehicle.

Accordingly, it is an object of this invention to provide a suspension system for truck or trailer having a smooth, continuously varying spring rate as load is increased on the vehicle.

It is another object of this invention to provide a suspension system for a truck or trailer that takes up increased load by providing an extra arm of a spring to take such extra load in a smooth, continuously increasing proportion as the load is increased on a vehicle.

It is another object of this invention to provide means for smoothly, continuously varying spring rates and increasing structural load-carrying capability with a truck or trailer in combination with a spring and vertical load-carrying member also absorbing acceleration and brake loads on the suspension system.

It is another object of this invention to provide a suspension system for a truck or trailer with variable spring rates that is light and inexpensive to build and maintain.

These and other objects of this invention are accomplished by providing a suspension system with a multitapered leaf spring combination. This combination comprises at least two tapered leaf springs fixedly attached to one another near their centers. The bottom leaf spring is coiled at one end to form a female cylindrically shaped bearing surface. This is journaled on a bracket fixedly attached to the frame of the vehicle. The journaled arm of the spring absorbs acceleration and brake loads on the suspension system. The topmost tapered leaf spring has an arm at its end most distant from the journaling of the aforesaid leaf spring that is in contact with a cam member fixed to the frame of the vehicle. The other arm of the topmost spring, at its end near the toward means of the aforesaid lower spring, is initially spaced at a vertical distance from a cam surface provided by a bracket fixed to the frame. While the vehicle is still in an unloaded condition, the arm of the lower spring, at its end furtherest from the aforesaid journaling on the other arm of the lower spring, is separated at its extreme end by a vertical distance from the nearest arm of the topmost spring. As the vehicle is loaded, the topmost and bottommost springs are pressed towards each other and have a greater area of contact with one another. The free arms of the top and bottom springs move towards their nearest cam surfaces fixed to the frame of the vehicle. When the vehicle is fully loaded, both arms of both springs are each carrying a significant portion of the load and each contribute a significant portion toward the spring rate of the combination.

Other objects of this invention will appear in the following description and appended claims, referring to the accompanying drawings forming a part of this specification.

On the drawings:

FIG. 1 is a partial transverse sectional view of a tapered leaf spring used in the preferred embodiment of this invention;

FIG. 2 is a transverse sectional view of a combination of tapered leaf springs used in the preferred embodiment of this invention;

FIG. 3 is a side view of the preferred embodiment of this invention:

FIG. 4 is a cross-sectional view taken along lines 4–4 of FIG. 3; and

FIG. 5 is a cross-sectional view of the apparatus shown in FIG. 3 taken along lines 5–5 of FIG. 3.

Before explaining the present invention in detail, it is to be understood that the invention is not limited in its application to the details in construction and arrangement of parts illustrated in the accompanying drawings since the invention is capable of other embodiments and of being practiced or carried out in various ways. Also it is to be understood that phraseology and terminology employed herein are for the purpose of description and not of limitation.

As shown on the drawings:

FIG. 1 is a partial view of a tapered leaf spring used in the preferred embodiment of this invention. The spring 10 is shown in a flat or uncambered position. The middle portion 14 of the spring is flat. The left arm portion of the spring has a gentle slope on its underside 16 tapering to a narrower thickness at its forward end. Immediately adjacent and aft of the bottom flat portion 14 is a portion 18 that has a steeper angle of narrowing thickness than the slope 16. Aft and adjacent to the bottom surface 18 is the bottom surface 20 which continues to slope at a less steep angle than the slope of surface 18.

In FIG. 2 there is shown a combination of two tapered leaf springs such as the leaf spring 10 shown in FIG. 1. These springs are cambered into partial ellipses. The bottom spring 22 is attached at its center portion 24 to the center portion 26 of a top spring 28. This is accomplished by means of shims or liners 30 placed on the top and bottom surfaces of the springs 22 and 28, and a nut and bolt assembly 32.

The forward end 34 of the bottom spring 22 is rolled into a cylindrical shape. Inserted into this cylindrical shape is a cylindrical bushing or bearing 36. The forward arm 37 of the spring 22 bears a significant portion of the vertical load on the suspension combination in both the loaded and unloaded condition of the vehicle to which it is attached, as well as the brunt of acceleration and braking loads applied to the suspension system. This is referred to as a Bartuska in the art.

The aft portion 38 of the bottom spring 22 is curved upwardly from the middle near shim 30. Its end 40 has a subsequent slight downturn and is separated at a distance from the end 42 of the aft portion 44 of the top spring 28 when the spring combination 46 is placed in a vehicle in a relatively unloaded condition. Thus, when the spring combination 46 is in a vehicle in a relatively unloaded condition, the aft portion 38 of the lower spring 22 does not carry any of the load applied to the suspension system.

The forward portion 48 of the top most spring 28 is curved upwardly from the middle portion 26 of the top spring 28. Its forwardmost end 50 is bent downwardly and forward of the Bartuskalike end 34 of the bottom spring. Should the forward portion 37 of the bottom spring 22 fail, the hooked end 50 of the topmost spring 28 provides a reserve safety means for catching hold of the bracket, to which the Bartuska 34 is attached, to support the load released by a broken spring portion 37.

In the normal relatively unloaded condition of the vehicle, in which the spring system 46 is illustrated in FIG. 2, the top surface 52 of the forward portion 48 of the top spring 28 is separated at a distance from any contact with the frame of the vehicle or structural member attached to it. Thus when the vehicle is in an unloaded condition, no loads are carried by the forward portion 48 of the topmost spring 28 of the spring system 46.

The aft portion 44 of the top spring 28 is curved upwardly from the middle portion 26 of the spring 28. The end 42 of the aft portion 44 has a surface 54. This surface is in direct contact with a cam surface bracketed to the frame of the vehicle. Throughout both the loaded and unloaded conditions of such a vehicle, the upper aft portion 44 supports vertical load applied to the suspension. The distance between the bottom surface 56 of the topmost spring 28 and the topmost surface 58 of the bottom spring aft portion 38 is the same as the distance separating the top surface 52 of the forward portion 48 of the topmost spring and a cam surface of a bracket that comes into contact with surface 52 when the vehicle is sufficiently loaded. These corresponding differences are reduced at a similar rate as increased load is placed upon the vehicle. When a predetermined level of load is reached, the topmost surface 52 of the forward arm 58 of the top spring 28 begins to bear a portion of the vertical load on the vehicle. At the same time, the aft portion 38 of the bottom spring 22 also begins to bear a portion of this vertical load.

In FIG. 3 there is shown a side view of the preferred embodiment of this invention. In it, two spring assemblies are shown of the type shown in FIG. 1. This is an application to a tandem axle. For both axles, similar spring assemblies 62 forward and 64 aft are used. They are attached at their central portions 66 and 68 to axles 70 and 72 respectively. These axles are driven by drive train members 71 and 73, respectively. The springs are secured to the axle by means of U-bolts 74 and 76 respectively, shims 78 and 80 respectively, spring seats 82 and 84 respectively, and axle clamps 85 and 86 respectively.

The forward arm portion 88 of the lower spring 90 of forward spring combination 62 is secured to a Bartuskalike securing means shown generally at 92 and illustrated in further detail in FIG. 4.

The securing assembly 92 comprises a spring hanger bracket 94 which is rigidly secured to the frame 96 of the vehicle by means of bolts 98. A compression bolt 100 is inserted in the bracket 94 and is pressed against a rubber bushing that is cylindrically shaped and coaxial with the compression bolt 100. A bolt 104 has a parallel noncoincident axis and rotates within the compression bolt 100. By turning the bolt 104, the position of the spring assembly 62 can be changed in order to provide precise location of the axle to which it is secured with respect to means driving this axle. An assembly 112 similar to the securing means 92 secures the forward arm portion 114 of the lower spring 116 of the aft spring assembly 64.

A walking beam 120 has a forward cam surface 122 and aft cam surface 124 for engaging the upper surface of the aft portions 126 and 128 respectively of upper springs 130 and 132 respectively of forward spring assembly 62 and aft spring assembly 64 respectively. The walking beam 120 has rubber rollers 134 and 136 respectively at its forward and aft ends below cam surfaces 122 and 124 respectively. These lower rubber rollers 134 and 136 provide a lower limit for travel of spring assemblies 62 and 64 respectively. They stop the aft portions 138 and 140 respectively of lower spring members 90 and 116 respectively.

The walking beam 120 is journaled to the frame of the vehicle 96 by means of a securing means shown in detail in FIG. 5. This securing means 166 comprises a bolt 170 secured by a steel cap 162 and rubber bushing 168 passing through the frame 172 and the walking beam portion 120. This assembly is secured by bolts to the frame.

It can be appreciated that in the preferred embodiment of this invention, with walking beam 120 contacting the rear portion of the forward and rear spring assemblies 62 and 64, the difference between the angles of the axes of means (pinion gears) driving the wells on the fore-and-aft shafts 70 and 72 is minimized during braking and acceleration.

It can also be appreciated from the foregoing description that the uses of multiple tapered leaf spring assemblies as shown is such that the forward arm of the lower spring in each spring assembly is secured to the frame of the vehicle in such a manner that precise location of the axles to which the springs are attached can be adjusted. Also, braking and acceleration loads will be applied to and carried by the forward arms of the lower spring members. Thus, the forward arms of the lower springs in both spring assemblies provide a dual function of carrying a significant portion of the vertical load as well as the acceleration and braking loads applied to the suspension systems. This will account for a considerable saving in weight.

It can also be appreciated that in the operation of a vehicle embodying the above-described described suspension, that the spring rate of the suspension varies as increased load is placed upon the vehicle. It can also be seen that the strength of the members carrying vertical load on a suspension is increased in correspondence with increased load being placed upon the vehicle. This is accomplished by adding additional arms of leaf springs into a structural load-carrying position as the vehicle is loaded from a relatively unladen to a fully laden condition. This is done in a smooth and continuous manner, and results in the upper and lower spring portions of each spring combination coming into full contact with one and other as the vehicle is fully loaded.

The wheels of the vehicle are held in a ground engaging position when transversing bumps by the walking beam member maintaining contact with the aft portions of the tandem suspension. Similar action of the walking beam reduces pinion angle on interaxle drive due to acceleration or breaking windup. In an alternative embodiment of this invention, the walking beam may actually be another spring having a spring rate having the same order of magnitude as the aforementioned tapered leaf springs. There may be variations in the taper of the springs such as having symmetrical tapers and having tapers on both sides of the spring. In another alternative embodiment of the present invention, one of the tapered leaf springs may be replaced by a combination of a composite, multiple leaf spring.

I claim:

1. In a motor vehicle suspension, the improvements comprising:

a driven axle;

a frame for the vehicle;

an upper tapered spring leaf having a thickness along a substantial length thereof at least 30 percent greater than the thickness align another substantial length thereof;

a lower tapered spring leaf having a thickness along a substantial length thereof at least 30 percent greater than the thickness along another substantial length thereof;

means securing said spring leaves to the axle near the centers of said spring leaves;

a bracket attached to said frame forwardly of said axle;

a flange on said bracket;

a camming surface on the underside of said flange;

said upper spring leaf and said lower spring leaf being shaped and secured with respect to each other comprising means separating the forward portion of said upper spring leaf at a distance from said camming surface when said vehicle is relatively unladen;

means securing the forward end of said lower spring leaf on said bracket;

a second camming surface attached to said frame and in contact with the rear portion of said upper spring leaf;

said upper spring leaf and said lower spring leaf being shaped and secured with respect to each other comprising means separating the rear portion of said lower spring leaf at a distance from said upper spring leaf when the vehicle is in a relatively unladen condition; and said upper spring leaf and said lower spring leaf being shaped and secured with respect to each other, and said second camming surface transmitting to the rear portion of said upper spring leaf a portion of the structural load on the suspension when the vehicle is more fully laden comprising means reducing said last-mentioned distance and causing the forward upper portion of the upper spring leaf and said rear portion of the lower spring leaf bear a portion of the structural load on the suspension when the vehicle is more fully laden;

the forward portion of the upper spring leaf and the portion of the lower spring leaf and the portion of the lower spring leaf between said bracket and axle being of a taper with increasing thickness rearwardly from said bracket to said axle.